United States Patent
Rhoades

[15] 3,679,955
[45] July 25, 1972

[54] CONTROL SYSTEM FOR COMPENSATING FOR DIMENSIONAL ERRORS DUE TO CUTTING TOOL WEAR IN AN AUTOMATIC MACHINE TOOL

[72] Inventor: John M. Rhoades, Waynesboro, Va.
[73] Assignee: General Electric Company
[22] Filed: June 7, 1971
[21] Appl. No.: 150,775

Related U.S. Application Data

[63] Continuation-in-part of Ser. No. 876,692, Nov. 14, 1969.

[52] U.S. Cl. ............................................................318/572
[51] Int. Cl. ...........................................................G05b 19/24
[58] Field of Search ............................................318/571, 572

[56] References Cited

UNITED STATES PATENTS

| | | |
|---|---|---|
| 3,073,998 | 1/1963 | Bower ............................318/572 |
| 3,328,655 | 6/1967 | Tripp ..........................318/572 X |
| 3,430,035 | 2/1969 | Read ...........................318/572 X |
| 3,500,150 | 3/1970 | Foster ............................318/572 |

Primary Examiner—Benjamin Dobeck
Attorney—William S. Wolfe et al.

[57] ABSTRACT

A control system including apparatus which compensates for wear of the cutting tool. In a contouring control wherein the programmed instantaneous velocity along the contour is represented by a vector V, first and second compensating arrangements measure the motion of the first and second axes drive motors and multiply output signals indicative thereof by a geometrical function of the angle between the programmed tangential path of the cutting tool and one of the axis and by a factor related to the magnitude of tool wear to produce compensation signals. The compensation signals are applied to motor control loops to cause the actual tangential path of the cutting tool to be offset by a distance vector C which is normal to the vector V and has a magnitude equal to that of cutting tool wear.

22 Claims, 7 Drawing Figures

PATENTED JUL 25 1972

INVENTOR.
JOHN M. RHOADES
BY Michael Masnik
HIS ATTORNEY

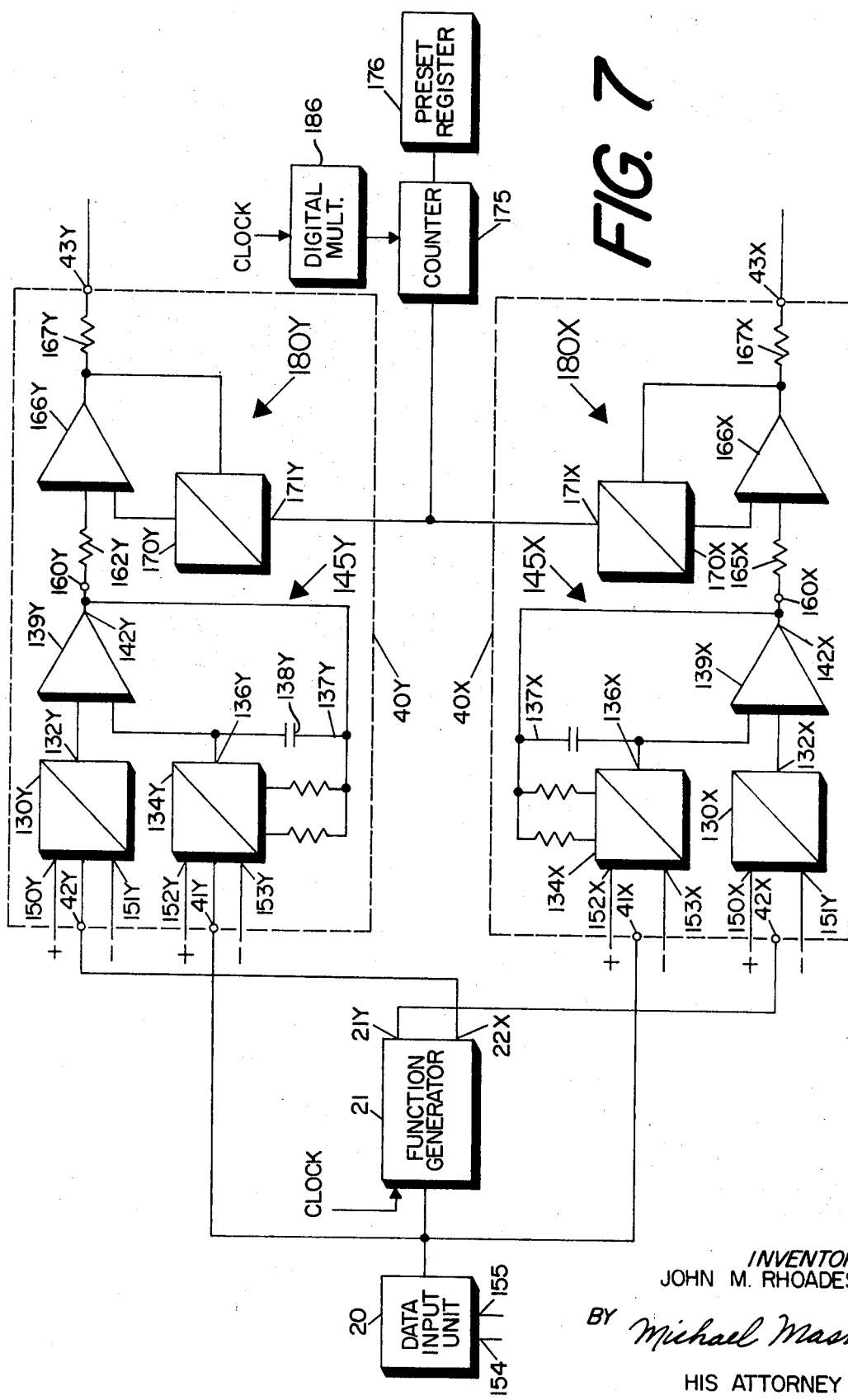

3,679,955

CONTROL SYSTEM FOR COMPENSATING FOR DIMENSIONAL ERRORS DUE TO CUTTING TOOL WEAR IN AN AUTOMATIC MACHINE TOOL

BACKGROUND OF THE INVENTION

This application is a continuation-in-part application Ser. No. 876,692 filed Nov. 14, 1969.

This invention relates to control systems for automatic machine tools. More specifically, it relates to a system for modifying the programmed motion of a cutting tool in an automatic machine tool to compensate for cutting tool wear.

In an automatic machine tool, a desired form is cut in a workpiece by moving the workpiece relative to a cutting tool within desired degrees of freedom. The relative motion is determined by command signals produced in response to instructions supplied to a data input means. The command signals are coupled to closed position control loops, each of which determines the motion of a servomotor which produces relative motion in one degree of freedom. Means are provided in each closed position control loop for comparing the actual position of each motor to its commanded position so that error signals are produced and utilized to drive each motor as each command signal calls for further motion.

The instructions to the data input means are most conveniently in the form of a part program which may be provided from a punched paper tape, by setting some thumbwheel switches on a control console or directly from a computer. A part program does not control the movement of the cutting tool directly but instead controls it indirectly by controlling the movement of a spindle in which the cutting tool is mounted. Thus, the spindle must be directed along a contour which is offset from the desired workpiece contour by a distance equal to the assumed radius of the cutting tool. At the time the part program is written, it is assumed the radius of the cutting tool is a constant. However, as a cutting tool operates over a large workpiece or over a long run of workpieces, it may wear appreciably.

To ensure that a workpiece machined with a worn cutting tool has the same configuration and dimensions as a workpiece machined with a new cutting tool, it is necessary to compensate for cutting tool wear. Although it would be possible simply to offset the spindle perpendicularly to the line of movement if the cutting tool were always moved in a straight line, such an adjustment is not useful where the programmed motion of the cutting tool changes in velocity and direction. One course of action would be the replacement of a worn cutting tool with a new cutting tool having dimensions within a desired tolerance. This, however, results in the expense of providing a new cutting tool and causes downtime in machine operation. A new part program, taking into account the new dimensions of the cutting tool, could be provided. This course of action would result in machine downtime and excessive programming costs.

SUMMARY OF THE INVENTION

The present invention is a control system for commanding the motion of a cutting tool in an automatic machine tool wherein the motion of the cutting tool is modified to compensate for cutting tool wear. The instantaneous velocity along the contour or tangential velocity of the cutting tool is represented by a vector V. An output indicative of a first axial component of the vector V is supplied to a multiplier circuit having a gain which varies with the magnitude of the vector V. The multiplier circuit output is applied to an offset circuit having an input related to the magnitude of tool wear. The output of the offset circuit modifies the programmed movement along the second axis. In a similar manner, the second axial component of the vector V is an input to a circuit which provides a signal for modifying programmed movement along the first axis. The resultant of the compensating signals is represented by a distance vector C which is always normal to the vector V and has a magnitude equal to that of tool wear.

DESCRIPTION OF THE DRAWINGS

The specification concludes with claims particularly pointing out and distinctly claiming that which is regarded as the present invention. Details of preferred embodiments of the present invention may be more readily ascertained by reference to the following description taken in connection with the accompanying drawings wherein:

FIG. 7 is a block diagrammatic representation of another form of the present invention including electronic means for automatically varying the magnitude of the compensating signal.

DETAILED DESCRIPTION

Mechanical Operation

Figure 1:
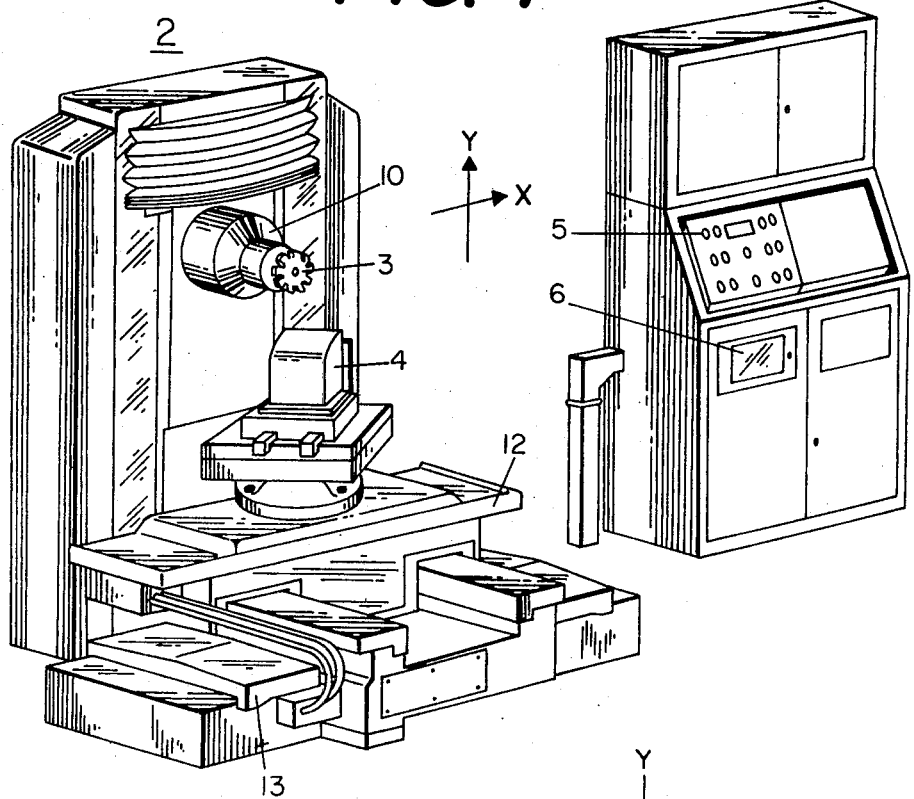
FIG. 1 is an illustration of an automatic machine tool and a control console comprising a system constructed in accordance with the present invention.

In FIG. 1, a control console 1 incorporating circuitry constructed in accordance with the present invention is connected to provide command signals to operate an automatic machine tool 2. The automatic machine tool 2 includes a cutting tool 3 which engages a workpiece 4. The command signals are produced in response to a part program which may be provided in a number of ways. A series of thumbwheel switches 5 may be manually set to determine the desired motion of the workpiece 4 with respect to cutting tool 3. Program data may also be provided from a punched paper tape reader 6 or directly from a computer (not shown).

Figure 2:
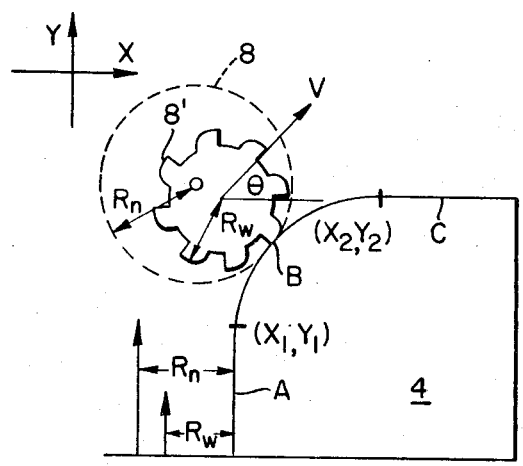
FIG. 2 is an enlarged partial view illustrating the engagement of a cutting tool with a workpiece.

The present invention is applicable to various forms of machine tools in which relative motion between a workpiece 4 and a cutting tool 3 is obtained by operating servomotors in response to command signals. The present analysis is with respect to a system in which movement in two perpendicular degrees of freedom is programmed. Referring to FIGS. 1 and 2 together, the cutting tool 3, which has an outer edge 8, is mounted on a spindle 10 and is moved in the vertical, or Y, direction by a servomotor 11. The workpiece 4 is mounted on a bed 12 movable in the horizontal, or X direction by a servomotor 13. The servomotors 11 and 13 may be hydraulic, electric or of any other suitable known type. In other machine tools relative motion between the cutting tool 3 and the workpiece 4 may be achieved in a different manner. In a lathe, for example, the workpiece 4 might be rotated on a spindle and servomotors may be provided to move a cutting tool along its length. Any two axes of the X, Y, or Z axes may be controlled in other types of machine tools.

Figure 3:
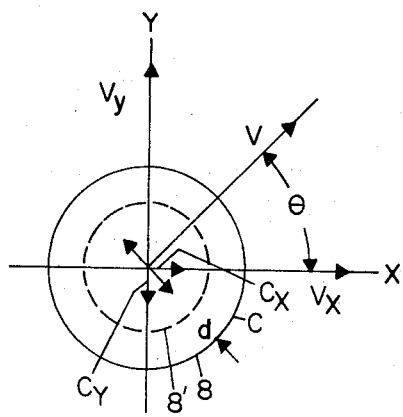
FIG. 3 is a vector diagram useful in understanding the results achieved through the use of the present control system.

The invention may be best understood by an analysis of its mechanical operation with reference to FIGS. 2 and 3 prior to a discussion of the circuitry shown in FIGS. 4–7. Although both cutting tool 3 and workpiece 4 may be in motion simultaneously, the discussion is simplied by referring to the relative motion as motion of the cutting tool.

In FIG. 2, a cutting tool is shown in a worn condition and a new condition. A new cutting tool, shown as a dotted circle, has a cutting edge 8. A worn cutting tool, shown in regular lined form, has a cutting edge 8'. Clearly, to machine a workpiece having a desired contour whether with a worn or a new cutting tool, a numerical control system must have the capability of moving the cutting tool spindle along a path spaced from the desired contour by the existing radius R of the cutting tool. For example, to machine the vertical surface A of workpiece 4 a new cutting tool would be driven along the Y axis on a path parallel to but spaced from the desired vertical surface by the new tool radius $R_n$. To machine the same surface, a worn cutting tool would be driven along the Y axis with its centerline on the radius $R_w$. The difference between the radii $R_n$ and $R_w$ is caused by cutting tool wear.

If tool movements were limited to movement along a single axis at a time, such as along the Y axis during machining of surface A or along the X axis during machining of horizontal surface B, tool wear could be compensated for simply by offsetting the cutting tool along the opposite axis by an amount equal to the change in cutting tool radius. In practice, arcuate and parabolic surfaces must be machined, making it impossible to use constant X or Y axis offsets. For curved surfaces such as surface B, the wear-compensating offsets must be along both axes and must change continuously with changes in the direction of movement of the cutting tool.

The present invention makes use of the fact that, regardless of the configuration of the surface being machined, the instantaneous direction of movement of the cutting tool spindle is parallel to a tangent to desired surface at the point of cutter contact with that surface. The movement of the cutting tool spindle at a particular time during the machining of curved surface B is represented by a vector V having a magnitude determined by the programmed velocity along the contour and a direction determined by the programmed start $(X_1, Y_1)$, and finish $(X_2, Y_2)$ points and the type of interpolation (circular) required. The instantaneous direction of the vector V can be defined by the angle $\theta$ which it forms with the X axis.

FIG. 3 is a diagram of the vectoral components which come into play to compensate for cutter tool wear. Let it be assumed that the cutting tool 3 has worn so that an outer edge 8' is exposed which is closer to the center of the cutting tool than the original outer edge 8 by an increment $d$. In this situation, the position of the cutting tool center must be offset a distance "$d$" from the programmed position. The direction of this offset must be normal to the vector V and toward the surface being machined. The required offset is represented by a vector C. The X and Y components of the vector C, $C_x$ and $C_y$ are superimposed on motion commands applied to X and y servomotors 11 and 13. Mathematically, the axial components of C may be expressed as:

$$C_x = d \sin \theta \quad (1)$$
$$C_y = d \cos \theta \quad (2)$$

The direction (+ or −) of vectors $C_x$ and $C_y$ depends on whether the cutting tool trajectory is to the right or the left of the workpiece surface.

Control Circuitry

While the compensating circuit constructed in the present invention is suitable for use with many forms of control circuits, it is illustrated here in conjunction with a numerical control circuit. A means for commanding the uncompensated motion of the X and Y servomotors 11 and 13 is fully described in U.S. Pat. No. 3,173,001 to John T. Evans, assigned to the General Electric Company, which is also assignee hereof, and therefore is only briefly described here. A data input unit 20 produces signals for each machining step, including initial and final coordinates, interpolative functions which are required and the feedrate or velocity along the contour. By prior definition, the instantaneous movement of the cutting tool is represented by the vector V. The data input 20 may include the thumbwheel switches 5 or punched paper tape 6 (FIG. 1) and appropriate clock inputs and reference counters to produce output pulses indicative of the vector V or may itself be a computer output. The output pulses of the data input unit 20 are coupled to a function generator 21. The function generator 21 resolves the output of the data input unit 20 into signals indicative of the desired Y and X components of motion needed to satisfy coordinate, interpolation and feedrate requirements contained in the input data. The output signal appearing at the terminal 22Y of the function generator 21 is coupled to one input of a command phase counter 24Y. This input signal modulates a clock input signal fed to the command phase counter 24Y from a clock source to produce a phase-shifted square wave output from phase command counter 24Y which is indicative of the desired Y motion. A position transducer 25Y is mechanically coupled to the servomotor 11 and also has an input from the clock source. The rotation of the position transducer 25Y modulates the clock input thereto to generate a phase-shifted output indicative of the actual position of the servomotor 11. The phase-shifted outputs of the command phase counter 24Y and position transducer 25Y are compared by a discriminator 26Y which produces an analog output related to the phase error therebetween. This analog output is the position command signal for the Y servomotor 11. The closed position loop comprises the Y servomotor 11, the position resolver 25Y and discriminator 26Y. The Y position command signal is applied to an operational amplifier 27Y, the output of which is connected to a velocity loop operational amplifier 28Y. The output of the operational amplifier 28Y determines the degree of opening of a servo valve 29Y and hence the velocity of the hydraulic Y servomotor 11. A velocity transducer in the form of a tachometer generator 30Y is mechanically coupled to the Y servomotor 11 and its output is coupled to the input of the operational amplifier 28Y to close the velocity feedback loop.

The components denoted by corresponding reference numerals followed by the letter X perform similar functions to command the motion of the servomotor 13.

Compensation Circuitry

First and second compensation circuits 40Y and 40X are capable of generating outputs which modify the analog signals commanding the motion of the servomotors 11 and 13 respectively to compensate for tool wear. The compensation circuit 40X has a first input terminal 41X connected to the output of the data input unit 20 and a second input terminal 42X connected to the output of the tachometer generator 30Y. Similarly, the compensation circuit 40Y has one input terminal 41Y connected to the output of the data input unit 20 and another input terminal 42Y connected to the tachometer generator 30X. Stated generally, each compensation circuit in this embodiment of the invention receives one input indicative of the programmed tool velocity along the contour and another input indicative of the actual tool velocity along one of the axes.

Figure 4:
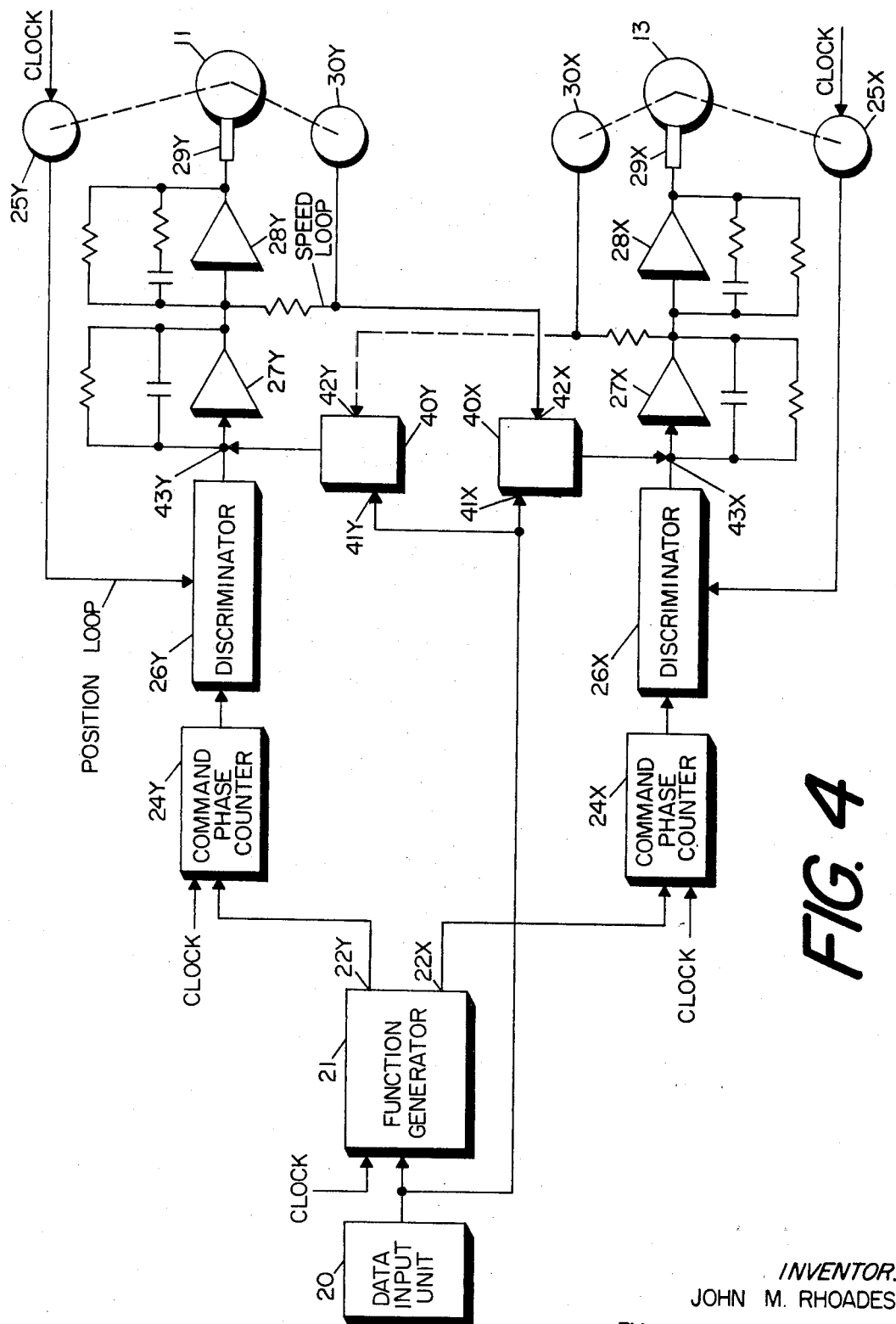
FIG. 4 is an illustration in block diagrammatic form illustrating the connection of a compensation circuit constructed in accordance with the present invention in a numerical control system.
Figure 5:
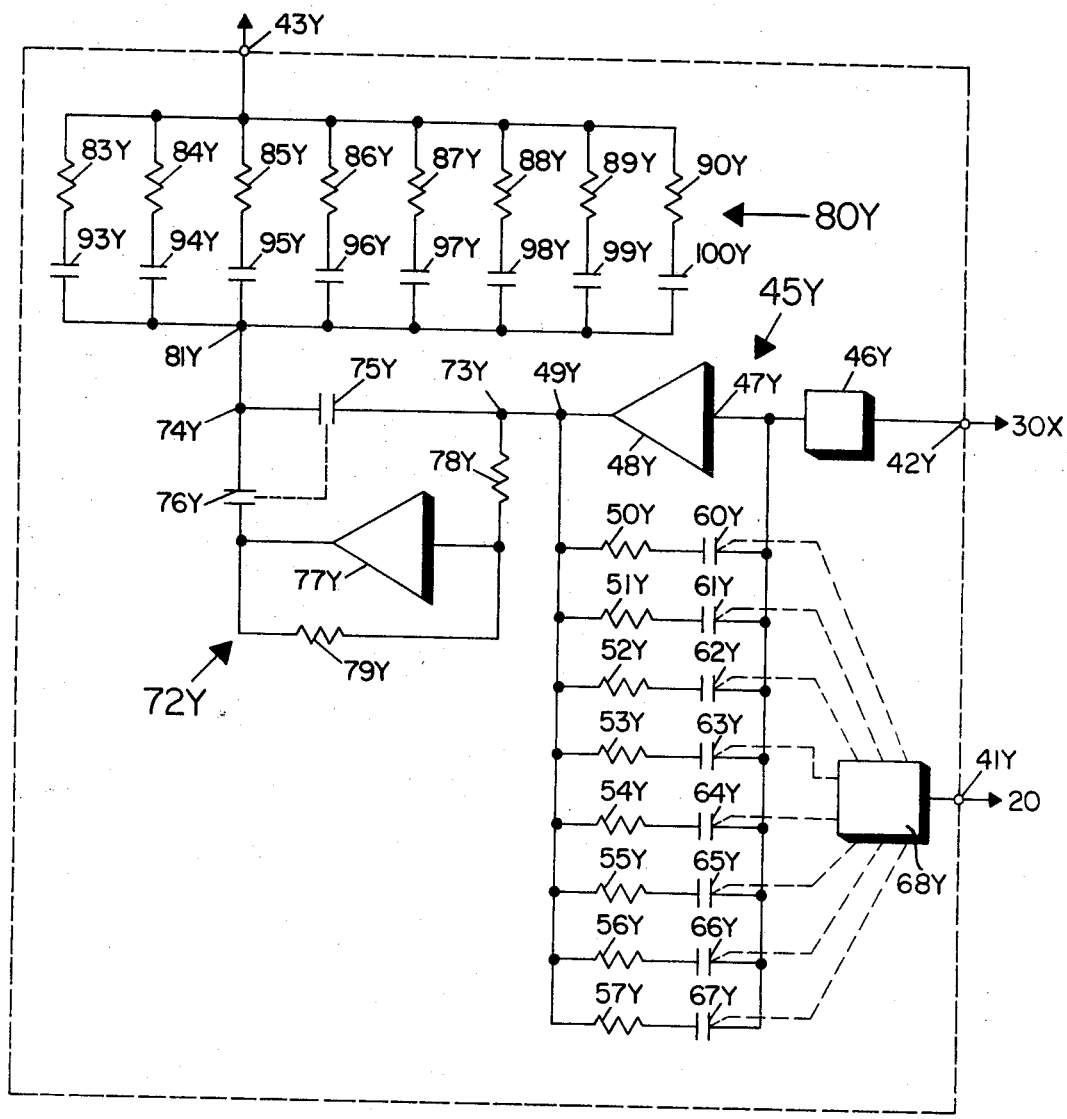
FIG. 5 is a partially schematic and partially block diagrammatic representation of one form of compensating arrangement constructed in accordance with the present invention.

Referring now to FIG. 5, additional details of one embodiment of a compensation circuit 40Y constructed in accordance with the present invention are illustrated. The input terminal 41Y carries a signal representing $V_i$, the programmed velocity along the contour, while the input terminal 42Y carries a signal representing $V_x$, the actual velocity of the cutting tool along the opposite (X) axis. The output terminal 43Y is connected to the Y axis closed position loop as shown in FIG. 4 to modify the Y axis position error signals. The compensation circuit 40Y includes a multiplier circuit 45Y connected to the input terminals 41Y and 42Y. A resistor 46Y has a first terminal connected to the input terminal 42Y and a second terminal connected to the input terminal 47Y of an operational amplifier 48Y. An output terminal 49Y of the operational amplifier 48Y is the output terminal of the multiplier 45Y.

As mentioned earlier, the Y component $C_y$ of the compensating vector C is expressed mathematically as $C_y = d \cos \theta$. The function of the multiplier circuit 45Y is to produce an output voltage representing the value of $\cos \theta$. In essence, this output voltage is derived by dividing a voltage representing the actual velocity $V_x$ by a factor representing the programmed velocity $V_i$ along the contour or, expressed mathematically:

$$\cos \theta = (V_x/V_i) \quad (3)$$

In multiplier circuit 45Y, the $V_x$ signal is applied to input terminal 47Y of operational amplifier 48Y. The output of operational amplifier 48Y is made equal to the quotient expressed in equation (3) by varying feedback around operational amplifier 48Y as an inverse function of the value of velocity $V_i$. A bank of resistors 50Y–57Y, each of which is connected in series with a switch in a bank of switches 60Y–67Y, provides a negative feedback path from the output to the input of operational amplifier 48Y. The switches 60Y–67Y are opened and closed individually by a switching circuit 68 which receives and decodes a signal representing programmed velocity $V_i$. Generally, as $V_i$ increases, switching circuit 68 decreases the effective feedback impedance by closing more of the switches 60Y–67Y.

As was explained with respect to FIG. 3, the direction of compensation must be chosen. Therefore, the Cos $\theta$ signal appearing on output terminal 49Y is applied to a polarity circuit 72Y having an input terminal 73Y and an output terminal 74Y. A first switch 75Y is connected between the terminals 73Y, amplifier 77Y and a resistor 78Y are all connected in series across the switch 75Y. A resistor 79Y is connected across the operational amplifier 77Y. The values of the resistors 78Y and 79Y are chosen so that the operational amplifier 77Y has a gain of −1. Switches 75Y and 76Y are ganged so that one is closed when the other is open. When the switch 75Y is closed, the output appearing at the terminal 49Y is directly coupled to the output terminal 74Y. When the switch 76Y is closed, the signal applied to terminal 74Y is equal in magnitude and opposite in polarity to the signal on the output terminal 49Y.

Thus far, a signal indicative of the direction of compensation and the value of Cos $\theta$ has been provided. To produce the compensation vector $C_y$, this signal is multiplied by the tool wear magnitude $d$ in an offset circuit 80Y. The magnitude of compensation $d$ to be provided corresponds to a value of current to be superimposed on the X axis servomotor position command signal. Therefore, a variable resistance is connected between the terminals 80Y and 43Y so that the desired current will flow through the offset circuit 80Y for a given voltage appearing at the input terminal 81Y. As shown in FIG. 5, the variable resistance consists of a bank of resistors 83Y–90Y each connected in series with one switch in a bank of switches 93Y–100Y. The resistor-switch series combinations are connected in parallel between the terminals 81Y and 43Y. The value of each of the resistors 83Y–90Y is chosen so that a current corresponding to a given magnitude of tool wear compensation flows therethrough.

For example, assume that the discriminator circuits 26X and 26Y are arranged to produce an analog command signal in which a command signal having a level of 0.25 ma commands the servomotor 11 or 13 to which it is coupled to move the cutting tool 3 a distance of 0.100 inch. Let it further be assumed that the cutting tool motion is on the X axis and that the magnitude $d$ of tool wear is 0.010 inch. In this situation, $C_x = 0$, and $C_y = 0.010$ inch. The voltage at the output terminal 49Y could be 1.0 volt, representing Cos $\theta$ where $\theta = 0°$. A compensation signal having a magnitude of $(0.010''/0.100) \times 0.25$ ma, or 0.025 ma must be provided at the output terminal 43Y. Therefore, using Ohm's law, a resistance $R$ having a value of $R = (1.00/0.025)$ ma, or 40,000 ohms, is connected between the terminals 81Y and 43Y.

Other forms of an offset circuit are described following a description of a further embodiment of a compensating circuit 40Y. The offset circuit 80Y of FIG. 5 is particularly suitable where it is desired to provide a thumbwheel switch arrangement for conveniently manually setting the magnitude $d$ of compensation. The compensating circuit 40X is arranged similarly. However, since the input to the terminal 42X is indicative of $V_y$, the output at the terminal 49X (FIG. 6) is equal to Sin $\theta$. It is noted that the correlation of input voltage to output current of the offset circuits 80X and 80Y must be the same for proper compensation.

Summarizing, an output current corresponding to $C_x$ is superimposed on the X position command signal and the current corresponding to $C_y$ is superimposed on the Y position command signal so that a motion indicated by the vector C as shown in FIG. 3 is superimposed on the vector V and desired compensation is achieved.

Figure 6:
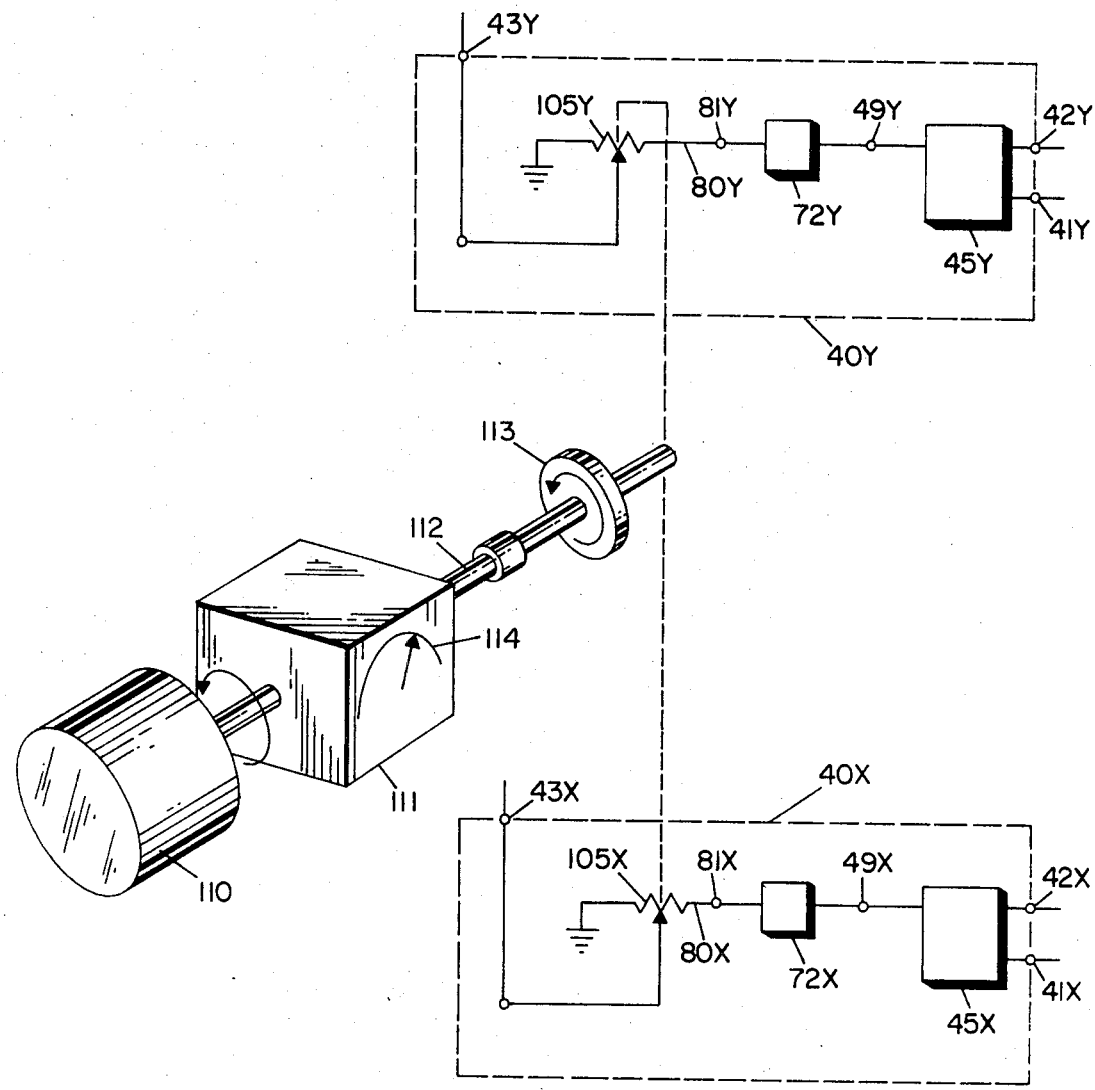
FIG. 6 is a partially schematic and partially block diagrammatic representation of another form of compensating circuit including mechanical means for automatically varying the magnitude of the compensating signal.

As seen in FIG. 6, the variable resistance connected between the terminals 81Y and 43Y could comprise a potentiometer 105Y, one end of the potentiometer being connected to the terminal 81Y and the wiper arm of the potentiometer being connected to the terminal 43Y. The offset circuit 80X may be similarly arranged. Since in many cutting operations, the cutting tool 3 wears at a constant rate, the magnitude of $d$ increases nearly linearly. Therefore, the arrangement of FIG. 6 may be utilized to automatically adjust the resistance Of the offset circuits 80X and 80Y as the cutting tool 3 wears. A timer motor 110 is provided and is energized from a regulated source (not shown) to provide a constant speed output. The motor 110 is coupled to a variable gearing arrangement 111 having an output shaft 112 so that the ratio of revolutions of the motor 110 to the shaft 112 may be set in accordance with the rate of tool wear. The output shaft 112 is mechanically coupled to a mechanical adjusting means 113 which is mechanically coupled to the wiper arms of the potentiometers 105Y and 105X respectively connected in the offset circuits 80Y and 80X respectively. The potentiometers 105X and 105Y have identical resistance versus angular displacement of wiper arm characteristics so that they are simultaneously identically adjusted as the motor 110 rotates. The mechanical adjusting means 113 may be preset so that the values of the potentiometers 105X and 105Y correspond to the initial values of compensation to be provided. An indicator 114 may be provided on the variable gear arrangement 111 to set the gear ratio in terms of tool life, which corresponds to the rate of wear on the cutting tool 3.

Another form of compensation circuit 40 including another form of offset circuit is illustrated in FIG. 7. The operation is explained with reference to the compensating circuit 40Y. Once again, the input terminal 41Y is connected to the data input unit 20 to receive data indicative of $V_i$. The input terminal 42Y is connected, however, to the output terminal 22X of function generator 21 to receive a signal representing programmed rather than actual velocity along the X axis. The compensating circuit 40Y in this embodiment includes a multiplier circuit 145Y which provides a voltage indicative of Cos $\theta$. The compensating circuit 145Y includes a first digital-to-analog converter 130Y having an input connected to the input terminal 42Y and an output terminal 132Y. A second digital-to-analog converter 134Y is provided having input connected to the input terminal 41Y, an output terminal 136Y, and a feedback terminal 137Y. The digital-to-analog converter 134Y is connected in the feedback loop of an operational amplifier 139Y having a first input terminal connected to the output terminal 132Y of the digital-to-analog converter 130Y and a second input terminal connected to the output terminal 136Y of the digital-to-analog converter 134Y. An output terminal 142Y of the operational amplifier 139Y is connected to the feedback input terminal 137Y of the digital-to-analog converter 134Y. A capacitor 138Y is connected across feedback loop of the operational amplifier 139Y so that its output is smoothed and comprises a direct current output. The multiplier circuit 145Y operates in the following manner.

Let it be assumed that a vector V is programmed having a velocity of 10 inches per minute and that this velocity is represented by an output of $10 \times 10^4$ pulses per minute produced by the data input unit 20. This pulse train indicative of the vector V is applied to the input terminal 41Y at the digital-to-analog converter 134Y. As pulses are applied to the digital-to-analog converter 134Y, resistors included therein are rendered conductive during each pulse duration to vary the gain of the operational amplifier 139Y in accordance with the magnitude of the vector V. Let it further be assumed that the $\theta = 45°$, so that the component of motion $V_x$ is represented by an output of $7.07 \times 10^4$ pulses per minute appearing at the output terminal 22X of the function generator 21. These pulses indicative of $V_r$ are applied to the input terminal 42Y at digital-to-analog converter 130Y. Each pulse applied to the digital-to-analog converters 130Y and 134Y turns them on for a fixed period of time. Thus, time modulated outputs are applied to the input terminals of the operational amplifier 139Y. Since the gain of the operational amplifier 139Y varies with the vector V, the voltage appearing at the output terminal 142Y is proportional to the ratio of the numbers of input pulses respectively supplied to its first and second input terminals. In the present example, this ratio is equal to $(7.07 \times 10^4/10.0 \times 10^4)$ or 0.707 which is equal to the cosine of 45°. Thus the voltage appearing at the terminal 142Y is indicative of Cos $\theta$. Similarly, the voltage appearing at the terminal 142X in the compensating circuit 40X is proportional to the ratio of Y component of motion to the resultant motion, and is thus indicative of Sin $\theta$. It should be noted here that the multiplier circuit 145Y operates similarly to the multiplier circuit 45Y of FIG. 5 in that an input signal indicative of $V_r$ is supplied to an operational amplifier, the gain of which is controlled by an input signal indicative of the vector V. In the embodiment of FIG. 7, however, the input signals are digital rather than analog.

The multiplier circuit 145Y also acts as a polarity circuit for determining the direction of compensation in the following manner. First and second positive and negative polarity terminals 150Y and 151Y are provided in the digital-to-analog converter 130Y to determine the polarity of its output. One of the two terminals 150Y and 151Y is energized by any convenient means. One such convenient means comprises the further provision of preparatory command signals in the instructions provided to the data input unit 20. To implement the provision of preparatory command signals, polarity terminals 154 and 155 are included in the data input unit 20. Terminals 154 and 155 are coupled respectively to the polarity terminals 150Y and 151Y. The same polarity terminals 154 and 155 are also respectively coupled to the corresponding X polarity terminals 150X and 151. If desired, a manual switching control (not shown) may be incorporated in the control console 1 of FIG. 1 in place of the polarity terminals 154 and 155.

An offset circuit 180Y having an input terminal 160Y connected to the output terminal 142Y and an output at the output terminal 43Y is provided to relate the output of the multiplier circuit 145Y to the magnitude of tool wear correction to be provided. The offset circuit 180Y includes a resistor 162Y, an operational amplifier 166Y having a first input terminal connected to resistor 162Y and an output terminal, and a coupling resistor 167Y. A digial-to-analog converter 170Y is connected in the feedback loop of the operational amplifier 166Y by connecting its feedback input terminal to the output terminal of the operational amplifier 166Y and its output terminal to a second input of the operational amplifier 166Y.

In this embodiment, the tool wear correction is varied automatically in correspondence with the actual rate of wear of the cutting tool 3. In order to accomplish this, a counter 175 is connected to an input terminal 171Y of the digital-to-analog converter 170Y. A source of clock pulses is coupled to a digital multiplier 186 which provides an output to the counter 175. The digital multiplier is arranged to divide the clock pulse rate so that the number in the counter increases at a rate proportional to tool wear. The function of the digital multiplier 186 is similar to that of the variable gear arrangement 111 in the mechanical embodiment of FIG. 6. A preset register 187 is also coupled to the counter 185 so that at the initiation of operation, the number in the counter may be set to correspond to an initial degree of tool wear. The function of the present register 187 is similar to that of the mechanical adjusting means 113 of the embodiment illustrated in FIG. 6.

The offset circuit 180Y operates in the following manner. The value of the resistor 167Y is chosen to provide a reference gain for the operational amplifier 166Y. As the counter 175 counts in response to pulses applied from the digital multiplier 186, resistors included in the digital-to-analog converter 170Y are selectively rendered conductive to adjust the gain of the operational amplifier 166Y. The gain of the operational amplifier 166Y is thus made proportional to the contents of counter 175. Since the preset register 187 may be set to provide a number in the counter proportional to an initial degree of tool wear, and since the digital multiplier 186 provides pulses to the counter at a rate corresponding to that of the wear of the cutting tool 3, the output signal at terminal 43Y corresponds to the desired degree of compensation. Similarly, the output of the counter 175 is coupled to the terminal 171X and the compensation circuit 40X so that the gain of the operational amplifier 166Y is also proportional to the number in the counter 175. The outputs appearing at the terminals 43Y and 43X are coupled to the X and Y position loops, respectively, to compensate the position of the cutting tool in a manner explained above. It should be noted that the number supplied by the preset register to the counter 185 may be set by thumbwheel switches included in the group of switches denoted by the reference numeral 5 in FIG. 1.

The offset circuit 180Y shown in this figure is suitable for use in the embodiments of FIGS. 5 and 6. Similarly, the offset circuits of FIGS. 5 and 6 could be included in the compensation circuits 40X and 40Y of the arrangement of FIG. 7.

It is thus seen that the present invention comprehends the provision of correction signals superimposed on X and Y axis position command signals so that the path of a cutting tool relative to a workpiece is always offset by a compensation vector C which is always normal to the vector V representing the relative motion and has a magnitude equal to that of cutting tool wear. In practical application, the present system has operated to provide cutting tolerances within 0.001 inch.

The specification has shown various embodiments of the present invention to enable those skilled in the art to make many modifications of the circuitry disclosed to produce a control system constructed in accordance with the present invention.

I claim:

1. In a control system for commanding the motion of first and second drive means for producing relative motion between a cutting tool and a workpiece in an automatic machine tool and including first and second means providing command signals to first and second closed position control loops for driving said first and second drive means, a data input unit providing output data indicative of the desired resultant commanded motion, and a function generator having an input connected to said data input means and first and second outputs connected to said first and second command means respectively for producing first and second outputs respectively indicative of the desired motion in said first and second degrees of freedom, means for compensating the relative motion for dimensional errors introduced by wear on a cutting tool comprising in combination:

a. velocity indicating means for producing an output indicative of the motion of said first drive means;
    b. a multiplier circuit having first and second inputs and an output, said first input being connected to said velocity indicating means and said second input being coupled to the output of said data input means, said multiplier circuit providing an output proportional to the first input and having a gain varying in response to the magnitude of the output of said data input means;
    c. an offset circuit having an input coupled to the output of said multiplier circuit, said offset circuit being settable to modify the magnitude of the output of said multiplier circuit in accordance with the magnitude of the dimensional error to be compensated; and
    d. means coupling the output of said offset circuit to the second means providing command signals to modify the command signal supplied to the second closed position control loop.

2. A control system according to claim 1 wherein said velocity indicating means comprises a tachometer coupled to said first drive means.

3. A control system according to claim 2 wherein said multiplier circuit comprises:
   a. a first resistor having a first terminal connected to the first input of said multiplier circuit;
   b. an operational amplifier having a first input terminal connected to the second terminal of said first resistor and an output terminal connected to the output terminal of said multiplier circuit;
   c. an adjustable resistance connected across said operational amplifier; and
   d. means connected to the second input of said multiplier circuit for varying said adjustable resistance across said operational amplifier in proportion to the output of said data input means so that the ratio of said adjustable resistance to the value of said first resistor is inversely proportional to the ratio of the output of said data input means and a predetermined maximum velocity to provide an output of said multiplier circuit which is representative of a geometrical function of the angle of relative motion with respect to the axis defining the degree of freedom in which said first drive means produces motion.

4. A control system according to claim 3 wherein said adjustable resistance comprises a plurality of resistors and a switch connected in series with each resistor, and means connecting each combination of a resistor and a switch in parallel across said operational amplifier, and in which said connecting means being responsive to the output of said data input means comprises a switching circuit having an input connected to the second input of said multiplier circuit, said switching circuit being arranged to vary the resistance connected across said operational amplifier as the output of said data input means varies.

5. A control system according to claim 3 further comprising polarity reversing means connected between the output of said multiplier circuit and the input of said offset circuit for determining the direction of compensation to be provided.

6. A control system according to claim 5 wherein said polarity reversing means comprises:
   a. a first switch connected in series between the output of said multiplier circuit and the input of said offset circuit;
   b. a second switch, an operational amplifier, and a first resistor all connected in series across said first switch; and
   c. a second resistor connected across said operational amplifier, said first and second switches being ganged so that when one of said switches is closed, the other is open, and said operational amplifier having a gain of minus one.

7. A control system according to claim 6 further comprising a second compensating means and a tachometer coupled to said second drive means, the output of said tachometer being coupled to the input of said compensating means and the output of said second compensating means being coupled to modify the command signals applied to said first closed control loop, the offset circuits included in said first and second compensating means being set to modify the output of each multiplier circuit in the same proportion.

8. A control system according to claim 7 wherein each of said offset circuits comprises a variable resistance being settable so that its value inversely corresponds to the magnitude of compensation to be provided, and further comprising a timer motor mechanically coupled to adjust said resistances, the rate of adjustment produced by said motor being chosen to correspond to the rate of tool wear during a cutting operation.

9. A control system according to claim 1 wherein said velocity indicating means comprises the first output of said function generator.

10. A control system according to claim 9 wherein the output of said data input means and said function generator are digital and said multiplier circuit comprises:
   a. a first digital-to-analog converter having an input connected to the first input of said multiplier circuit;
   b. a second digital-to-analog converter having an input connected to the second input of said multiplier circuit; and
   c. an operational amplifier having first and second inputs respectively connected to the outputs of said first and second digital-to-analog converters and an output connected to the output terminal of said multiplier circuit, said second digital-to-analog converter being connected between the output terminal of said operational amplifier and its second input terminal to vary the gain thereof in response to the output of the data input unit, whereby said multiplier circuit produces an output proportional to the pulse rate input ratio of said second input to said first input of said multiplier circuit.

11. A control system according to claim 10 further comprising a second compensating means having an input coupled to the second output of said function generator and an output coupled to modify the command signals supplied to said first closed control loop.

12. A control system according to claim 11 wherein:
   a. said offset circuit in each compensating arrangement comprises an operational amplifier having a first input terminal, a second input terminal, and an output terminal; and
   b. means connected across each of said operational amplifiers for varying its gain in proportion to the degree of compensation to be provided, said means for varying the gain of each of said operational amplifiers comprising a digital-to-analog converter connected between the output terminal of each of said operational amplifiers and its second input terminal, a digital multiplier for connection to a source of clock pulses, said digital multiplier producing a pulse rate indicative of the rate of tool wear, and a counter connected to said digital multiplier and providing an input to each of said digital-to-analog converters, whereby the gain of said operational amplifiers is proportional to the number in the counter.

13. A control system according to claim 12 further comprising a preset register connected to said counter for setting a number in said counter indicative of an initial degree of compensation to be provided.

14. A control system according to claim 1 wherein said offset circuit comprises a variable resistance, said resistance being settable to inversely correspond to the magnitude of compensation to be provided.

15. A control system according to claim 14 further comprising a timer motor mechanically coupled to adjust said variable resistance, the rate of adjustment produced by said motor corresponding to the rate of tool wear during a cutting operation.

16. A control system according to claim 1 wherein said offset circuit comprises an operational amplifier having a first input terminal, an output terminal, and means connected across said operational amplifier for varying its gain in proportion to the degree of compensation to be provided.

17. A control system according to claim 16 wherein said means for varying the gain outside operational amplifier comprises a digital-to-analog converter connected between the output terminal of said operational amplifier and its second input terminal for varying the gain of said operational amplifier, a digital multiplier for connection to a source of clock pulses, a counter coupled to said digital multiplier and providing an output to said analog-to-digital converter indicative of the expected rate of tool wear.

18. A control system according to claim 17 further comprising a preset register connected to said counter for setting a number in said counter indicative of an initial degree of compensation to be provided.

19. In a control system in which a first source of input data is provided indicative of the desired relative motion between a workpiece and a tool and first and second inputs are provided respectively indicative of the desired motion of first and second drive means and first and second degrees of freedom to produce the desired first and second components of relative motion, a method for compensating the relative motion for dimensional errors due to wear on the cutting tool comprising the steps of:

a. measuring the velocity of said first drive means to produce a first velocity indicating signal;
b. multiplying said first velocity indicating signal by the ratio of the instantaneous velocity of said relative motion to a maximum velocity to produce a first multiplier output;
c. multiplying first said output by plus or minus one to correspond to motion in first or second directions within said first degree of freedom to produce a first signal indicative of the direction of compensation to be provided in said second degree of freedom;
d. multiplying said last-named signal to produce an offset signal corresponding to the magnitude of compensation to be provided; and
e. utilizing said offset signal to modify the command signals applied to said second drive means.

20. A method according to claim 17 further comprising the steps of:
a. measuring the velocity of said second drive means to produce a second velocity indicating signal;
b. multiplying said second velocity indicating signal by the ratio of the instantaneous velocity of said relative motion to said maximum velocity to produce a second multiplier output;
c. multiplying said second multiplier output by plus or minus one to produce a second signal indicative of the direction of compensation to be provided in said first degree of freedom;
d. multiplying said last-named signal to produce an offset output corresponding to the magnitude of compensation to be provided; and
e. utilizing said offset signal to modify command signals applied to said first drive means.

21. A method according to claim 18 wherein the input data indicative of the desired velocity of each drive means is measured.

22. A method according to claim 19 wherein the input data indicative of the desired velocity of each drive means is measured.

* * * * *